United States Patent
Zhang

(10) Patent No.: US 9,032,326 B2
(45) Date of Patent: May 12, 2015

(54) LATE INSTANTIATION OF DEPENDENT OBJECTS

(75) Inventor: Wenli Zhang, San Jose, CA (US)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 13/529,124

(22) Filed: Jun. 21, 2012

(65) Prior Publication Data

US 2013/0346908 A1    Dec. 26, 2013

(51) Int. Cl.
*G06F 3/048* (2013.01)
*G06F 7/00* (2006.01)

(52) U.S. Cl.
CPC .. *G06F 3/048* (2013.01); *G06F 7/00* (2013.01)

(58) Field of Classification Search
CPC ................................... G06F 3/048; G06F 7/00
USPC .......................................... 715/780; 707/607
See application file for complete search history.

(56) References Cited

U.S. PATENT DOCUMENTS

| 6,697,815 B1 * | 2/2004 | Wilson .................................. 1/1 |
| 2008/0140458 A1 * | 6/2008 | Moore .............................. 705/5 |
| 2011/0307345 A1 * | 12/2011 | Kemper et al. ............... 705/26.3 |

* cited by examiner

*Primary Examiner* — William Bashore
*Assistant Examiner* — James F Sugent
(74) *Attorney, Agent, or Firm* — Kenyon & Kenyon LLP

(57) ABSTRACT

An enterprise management software system that provides a methodology for transient data storage, user action handling and dependent object creation process. When a dependent object is required to be added, the software system may remember the action without creating the dependent object. When a command is received to cancel the dependent object creation, the software system may work only on the transient data at a frontend and will not interact with backend. The dependent object may be instantiated when receiving a user command to save any entered data. Responsive to the user command, the software system may collect user input and trigger dependent object instantiation process at the backend.

17 Claims, 7 Drawing Sheets

700

LATE INSTANTIATION OF DEPENDENT OBJECTS

BACKGROUND

The present invention relates to business software applications, and in particular, business software applications that have dependent objects.

Modern software applications rely on business objects programmed using object oriented programming languages. The business objects typically implement business concepts and operations for business processes. Some of the business objects are main objects and some objects are dependent objects that depend from the main objects. The dependent objects can't exist by themselves. For example, a graphical user interface (GUI) in a modern software application allows users to interact with a computing device by directly manipulating displayed GUI elements, such as input fields, graphical icons and visual indicators (e.g., buttons, tabs, etc.), and the GUI is typically supported by a main UI business object and many dependent business objects depend from the main UI object. Sometimes, the GUI allows a user to operate on dependent objects (e.g., add, delete and/or create/save the dependent object). The GUI also normally provides capabilities to save the dependent object after user key in data and trigger save dependent object.

Conventional business software applications handle dependent object creation by physically instantiating the dependent object before a user manipulates data. However, this will cause frontend-backend interaction and system resource occupation as soon as the user starts working on a dependent object, and thus, affects system performance from the beginning when the computer system interacts with the dependent object because the dependent object typically resides at the backend. Moreover, when the user wants to cancel the operation, the created dependent objects need to be physically deleted, which is a waste of system resources. Therefore, there is a need in the art to manage instantiation of dependent objects to save resources and reduce waste.

DETAILED DESCRIPTION

Embodiments of the present invention relate generally to dependent object handling. More particularly, this invention relates to the management of dependent object instantiation and UI/Backend interaction process in enterprise software applications. In one embodiment, the dependent object is not instantiated when a user wants to key in data for a business process. Rather, the dependent object instantiation may be performed as a last step of the business process when a user is finished with the business process and issues a command to save the result of the business process. This approach of managing the instantiation of the dependent object is opposite to the conventional business software applications, which typically instantiate all business objects, including main and dependent objects as soon as a business process that uses the business objects starts.

One embodiment of the present invention provides a method of managing creation of dependent objects in a software application. The method may comprise receiving a first command to create a dependent object from a user, enabling a user interface (UI) component at a UI to accept user input at a frontend of the software application. Content of the user input may be one or more data values targeted for the dependent object. The method may further comprise creating a transient data field at the frontend to store the content of the user input and receiving a second command from the user. Further, the method may make a determination of whether the second command is to post data to a backend. If yes, the method may comprise collecting data stored in the transient data field, and instantiating the dependent object at the backend and assigning the content of the user input to a data filed of the dependent object.

Figure 1:
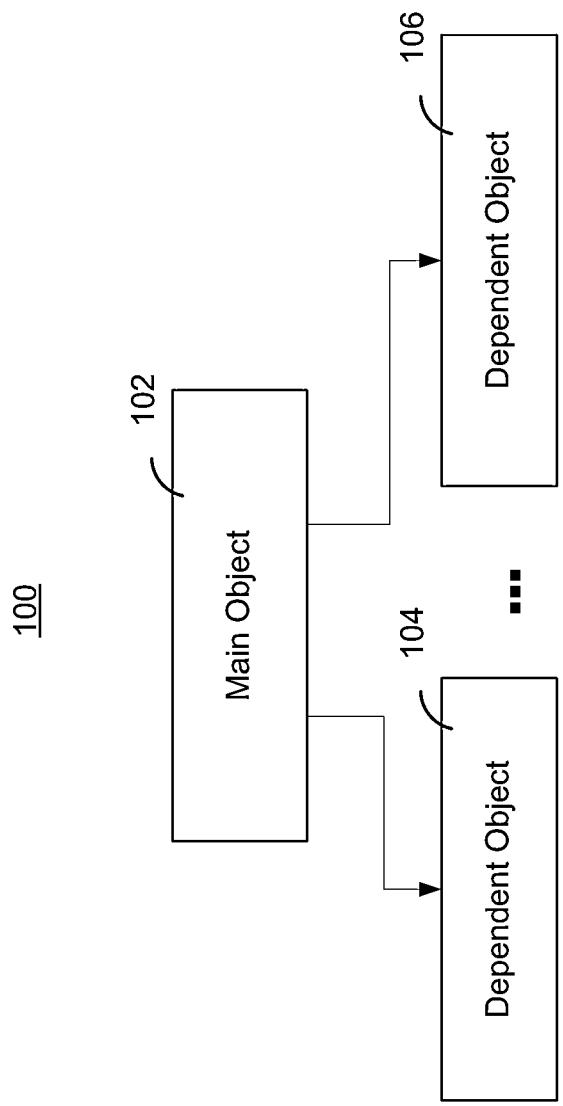
FIG. 1 is a block diagram showing multiple business objects in an enterprise management system according to an exemplary embodiment of the present invention.

FIG. 1 is a block diagram 100 showing multiple business objects in an enterprise management system according to an exemplary embodiment of the present invention. The multiple business objects may include a main object 102, and a plurality of dependent objects 104, 106. In one or more embodiments of the present invention, the dependent objects 104 and 106 may be objects that won't be instantiated and exist by themselves in the exemplary enterprise management system. For example, the exemplary enterprise management system may include a frontend to communicate with a user and a backend using business objects to model business processes. The dependent objects 104 and 106 may be backend business objects depend from the main object 102 and do not exist by themselves.

In an embodiment, the dependent objects 104 and 106 may be instantiated to interact with any frontend (e.g., UI) only when a related save action is triggered. Before the dependent objects 104 and 106 are instantiated, any attributes or data fields of the dependent objects 104 and 106 that may be filled in by a user may be stored in transient field(s) at the frontend. Accordingly, when the user accesses features provided by dependent object at the frontend, the exemplary enterprise management system may perform necessary interaction only in the frontend (e.g., locally maintaining the transient fields) without creating the dependent object in the backend. Thus, when the user wants to cancel actions related to a dependent object, any clean up operation may be necessary only on any transient data in the frontend and the exemplary enterprise management system will not interact with the backend. When the user triggers a save related operation, the exemplary enterprise management system may collect all user input and trigger dependent object instantiation process. Therefore, embodiments of the present invention may handle dependent objects efficiently by removing unnecessary backend interaction, reducing memory consumption and improving system performance.

Figure 2:
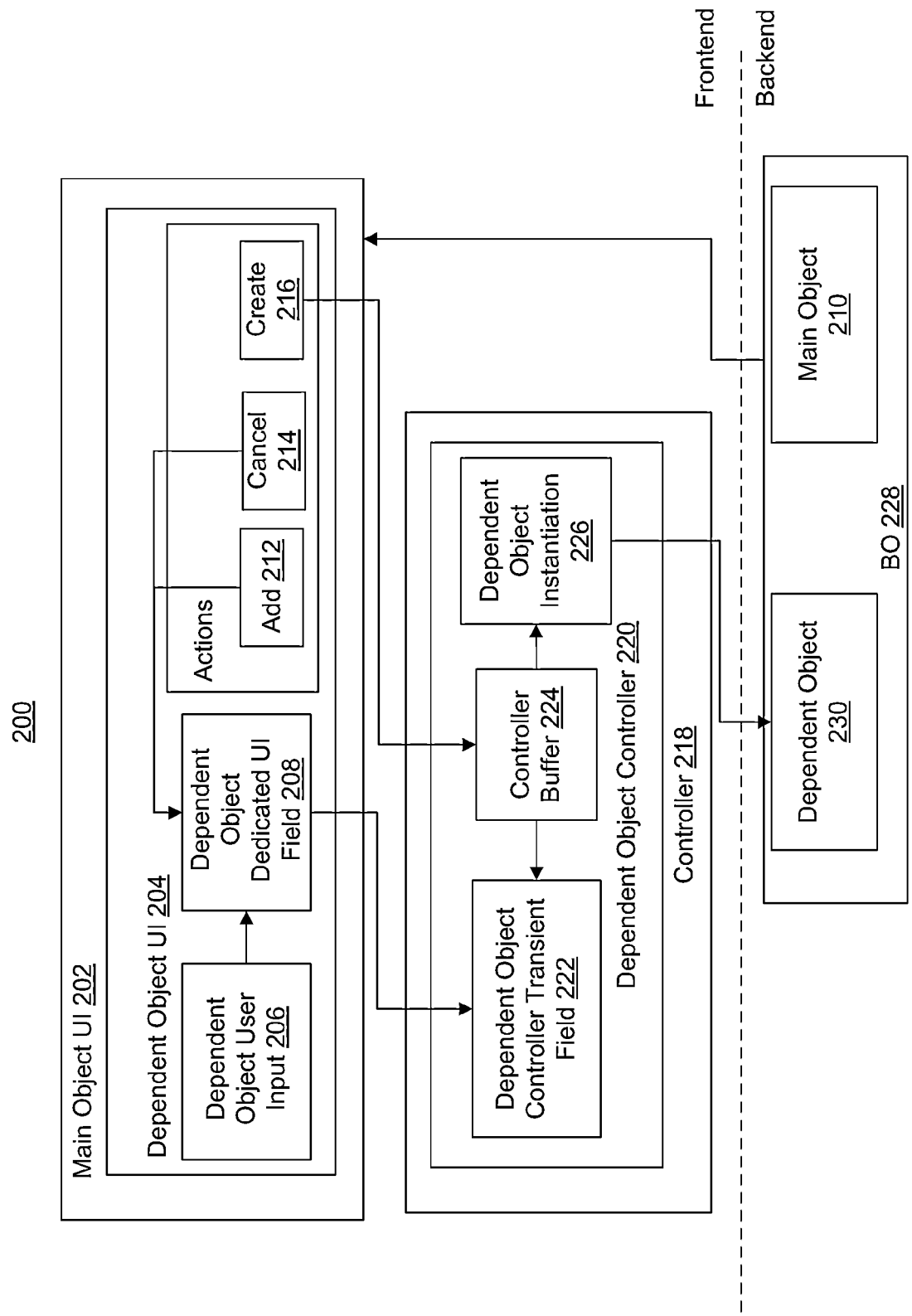
FIG. 2 is a block diagram that describes different layers of the system and the interaction flows of different building blocks according to an exemplary embodiment of the present invention.

FIG. 2 is a block diagram that describes different layers of an exemplary enterprise management system 200 and the interaction flows of different building blocks according to an exemplary embodiment of the present invention. The exemplary enterprise management system 200 may include a user interface (UI) layer represented by a main object UI 202 and a controller layer 218 at a frontend, and a business object layer 228 at a backend.

The main object UI 202 may include a dependent object UI 204. The dependent object UI 204 may include a dependent object user input 206, a dependent object dedicated UI field 208, and a plurality of actions (e.g., add 212, cancel 214 and create 216). The dependent object user input 206 may be a UI element that can accept user input, such as text boxes, check boxes, drop down list boxes, etc. The plurality of actions may be presented as buttons on the UI. The dependent object dedicated UI field 208 may be a data field for a corresponding dependent object. In one embodiment, the main UI object 202 may have a plurality of dependent object UIs with the dependent object UI 204 being a representative. Further, each dependent UI may have a plurality of dependent object user input 206s and a plurality of dependent object UI dedicated field 208s.

The business object layer 228 may comprise a plurality of business objects. As shown in FIG. 2, the business object layer 228 may include a main object 210 and a dependent object 230. The main object 210 may be a business object that models the business concept (including, e.g., properties and operations that may be performed by the business object). The main object 210 may be the main object corresponding to the main object UI 202. That is, the main object UI 202 may be a front user interface for the main object 210.

The dependent object 230 may be a business object corresponding to the dependent object UI 204. The dependent object 230 may depend from the main object 210 and does not exist by itself. In one or more embodiments, the instantiation of the dependent object 230 may be delayed. For example, when the main object UI 202 and dependent object UI 204 are presented to a user at the frontend, the dependent object 230 may not be instantiated yet. That is, while the dependent object user input 206 accepts user input and the dependent object dedicated UI field 208 has been modified by user input, the dependent object 230 corresponding to the dependent object UI 204 still does not exist yet. In one embodiment, the dependent object 230 may be instantiated only after the user issues a post or save command (e.g., click on the create button 216).

The controller 218 may include a dependent object controller 220. The dependent object controller 220 may include a dependent object controller transient field 222, a controller buffer 224 and a dependent object instantiation manager 226. The dependent object controller transient field 222 may be an exemplary transient field variable storage for a dependent object data field. The dependent object controller transient field 222 may provide a transient data storage place for the dependent object 230 before it is instantiated. There may be a plurality of dependent object controller transient field 222s in an embodiment. Each transient field 222 may be mapped to a dependent object data field.

The controller buffer 224 may provide dependent object transient field(s) mapping information and user input capturing for dependent object transient field(s). For example, when the frontend dependent object UI 206 receives user input, the user input may be assigned to the dependent object dedicated UI field 208. The controller buffer 224 may indicate a corresponding a transient field at the frontend (e.g., the dependent object controller transient field 222) to store the user input data before the dependent object 230 is instantiated. In an embodiment, the controller buffer 224 may be shared by a plurality of dependent objects that depend from same or different main objects.

The dependent object instantiation manager 226 may be responsible for instantiating the dependent objects when necessary. In one embodiment, when a user finishes working with the dependent object UI 208 and issues a command to post or save the work result (e.g., by invoking the create action 216), the controller buffer 224 may retrieve the user input data stored at the dependent object controller transient field 222(s) and pass them to the dependent object instantiation manager 226. The dependent object instantiation manager 226 may instantiate the dependent object 230 and assign the data values stored in the dependent object controller transient field 222(s) to appropriate data fields of the dependent object 230. In an embodiment, the dependent object instantiation manager 226 may be a common manager used to instantiate a plurality of dependent objects that depend from the same or different main objects.

Thus, in one embodiment, the user input may be linked and stored as controller transient field(s) data. Therefore, the UI layer may have the same user interface field(s) that can associate with controller transient field(s). The UI layer may have a UI control process for adding one or more dependent objects and canceling any dependent objects creation without interacting with the backend business object layer. In one or more embodiments, the business object layer 228 may instantiate dependant object(s) and save the dependent object(s) (e.g., in storage such as a database).

In one embodiment, the UI layer may be implemented in SAP© ByDesign Oberon UI technology, the controller layer may be implemented in SAP© ByDesign Enhanced Controller (ECO) based on ABAP technology, and the business object layer may be implemented using ABAP technology. However, the technique of the present invention can be implemented in any business applications. For example, embodiments of the present invention may be programmed in Java, C/C++, or any other languages. In ByDesign Oberon UI environment, the software application may create model node element(s) that bind to UI design environment for user input in Oberon. The controller (e.g., ECO) may create transient fields that reflect user input field(s). Model element(s) in Oberon may bind to transient field(s) in the controller. Moreover, the controller may implement a process to capture the changes made by a user and store into the controller buffer. In addition, the controller may implement a process to create and insatiate the dependent object(s).

Figure 3:
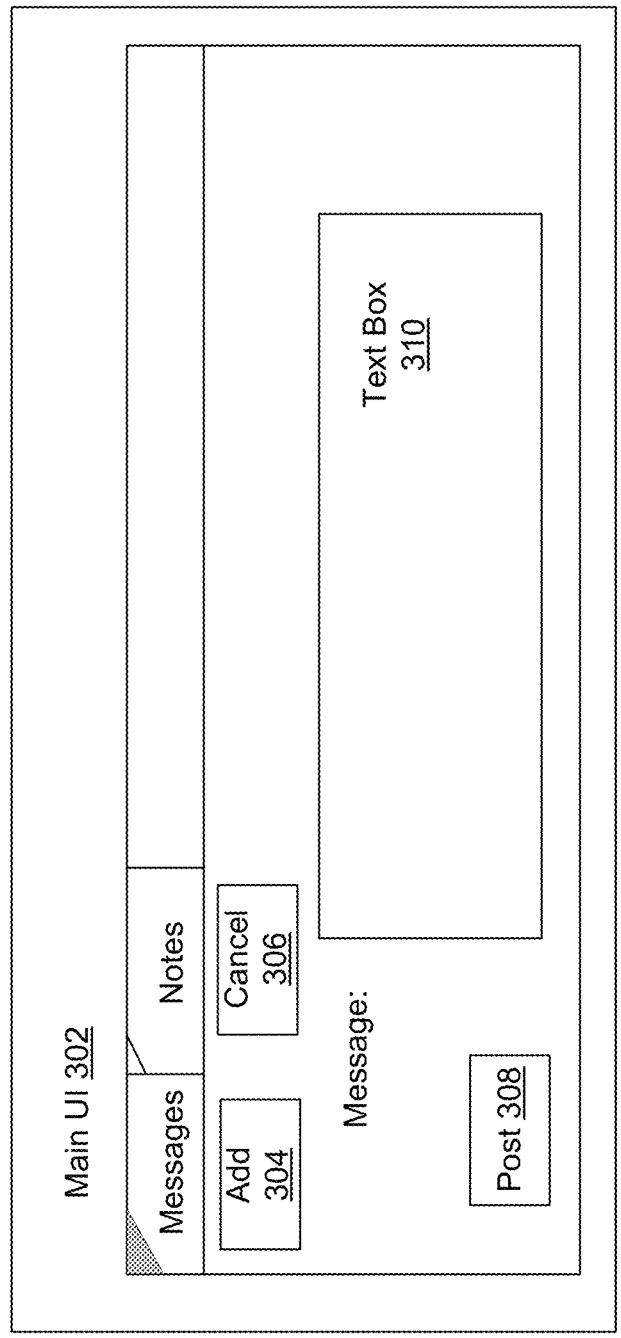
FIG. 3 is a graphical user interface (GUI) that displays dependent object UI behavior according to an exemplary embodiment of the present invention.

FIG. 3 illustrates a user interface (UI) 300 for an enterprise management system that provides delayed dependent object instantiation according to an exemplary embodiment of the present invention. The UI 300 may comprise a main UI 302, which may include a plurality of UI tabs (e.g., messages and notes). In one embodiment, the main UI 302 may be a UI for a main object (e.g., the main object 210) and each UI tab may be a dependent object UI element (e.g., the dependent object 230). Each UI tab may have has one UI element of a common dependent object. Alternatively, each UI tab may be a UI element of a different dependent object. For example, a message may be a dependent object and a note may be another dependent object.

The messages tab may be in focus right now and the dependent object UI for the messages may include an add button 304, a cancel button 306, a text box 310 to receive user input for content of a message and a post button 308. When a user clicks on the add button 304, any text entered into the text box 310 may be saved to a controller transient field that may correspond to a data field of a dependent object (e.g., a dependent business object for message). In one embodiment, the dependent business object may not be created while the user may enter text for it and add the message. The added message may be stored temporarily in a controller transient data field. For example, the controller may have a context element as the controller transient data field to hold a message input content, which may corresponds to a dependent object. The text box 310 may have a transient text field bound to the context element. There may be no backend call at this moment.

If the user clicks on the cancel button 306, the added message may be canceled before it is saved and the dependent business object may never be instantiated. If the user clicks on the post button 308, the dependent business object may be instantiated and any added message may be saved to a backend database. For example, when the dependent business object is instantiated, it may get the message input content from the controller transient data field. Therefore, in one or more embodiments, the messages or notes entered by a user will not cause corresponding backend dependent business objects to be instantiated or any messages/notes to be saved. In fact, the data entered by a user does not need to be transmitted to the backend unless the user clicks on the post button 308.

Figure 4:
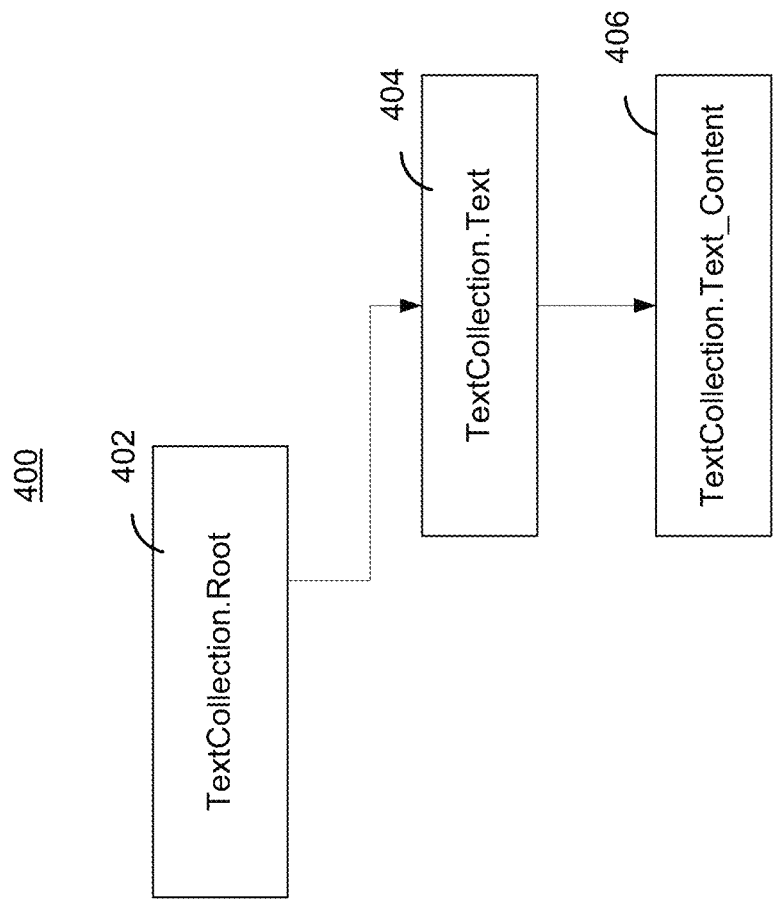
FIG. 4 is a block diagram an object hierarchy in an enterprise management system according to an exemplary embodiment of the present invention.

FIG. 4 illustrates a block diagram for an object hierarchy 400 in an enterprise management system according to an exemplary embodiment of the present invention. The object hierarchy 400 may comprise a TextCollection.Root object 402, one or more TextCollection.Text object(s) 404 and a TextCollection.Text_Content object 406 for each TextCollection.Text object(s) 404. The object hierarchy 400 may illustrate a plurality of nested dependent objects. The TextCollection.Root object 402 may be a root dependent object that depends from a main object directly. Each TextCollection.Text object(s) 404 may depend from the TextCollection.Root object 402. Each TextCollection.Text_Content object 406 may depend from a respective TextCollection.Text object(s) 404. The object hierarchy 400 may be the dependent objects eventually instantiated in the business object layer 228.

In one embodiment, instantiation of the TextCollection.Root object 402 may be delayed. For example, the controller layer on top of the business object layer may create a context element (e.g. Messages_Text or Notes_Text) as a transient field to hold message or note input content. The use input content may correspond to the TextCollection.TEXT_CONTENT's node element (e.g., data field). In the UI layer, the input text box may also have a transient context field that may be bound to this element. However, when a user click on "Add" button in the UI to add a new message or note, the input text box may be enabled for editing but the input text box's content may be stored in the transient fields and the frontend does not make backend call at this moment.

In an embodiment, in response to a post command issued by the user, a "Post" method implemented at the controller may be invoked to instantiate a series of dependent business objects (e.g., to create a message or note in the business object layer) with three layers described above. The input content stored at the transient data field may be retrieved and passed to the TextCollection.Text_Content object 402 to be persisted by the dependent business object. In an embodiment, the "Post" method may be a "Post_Notes" or "Post_Messages" implemented by a service object provided at the controller 218.

Figure 5:
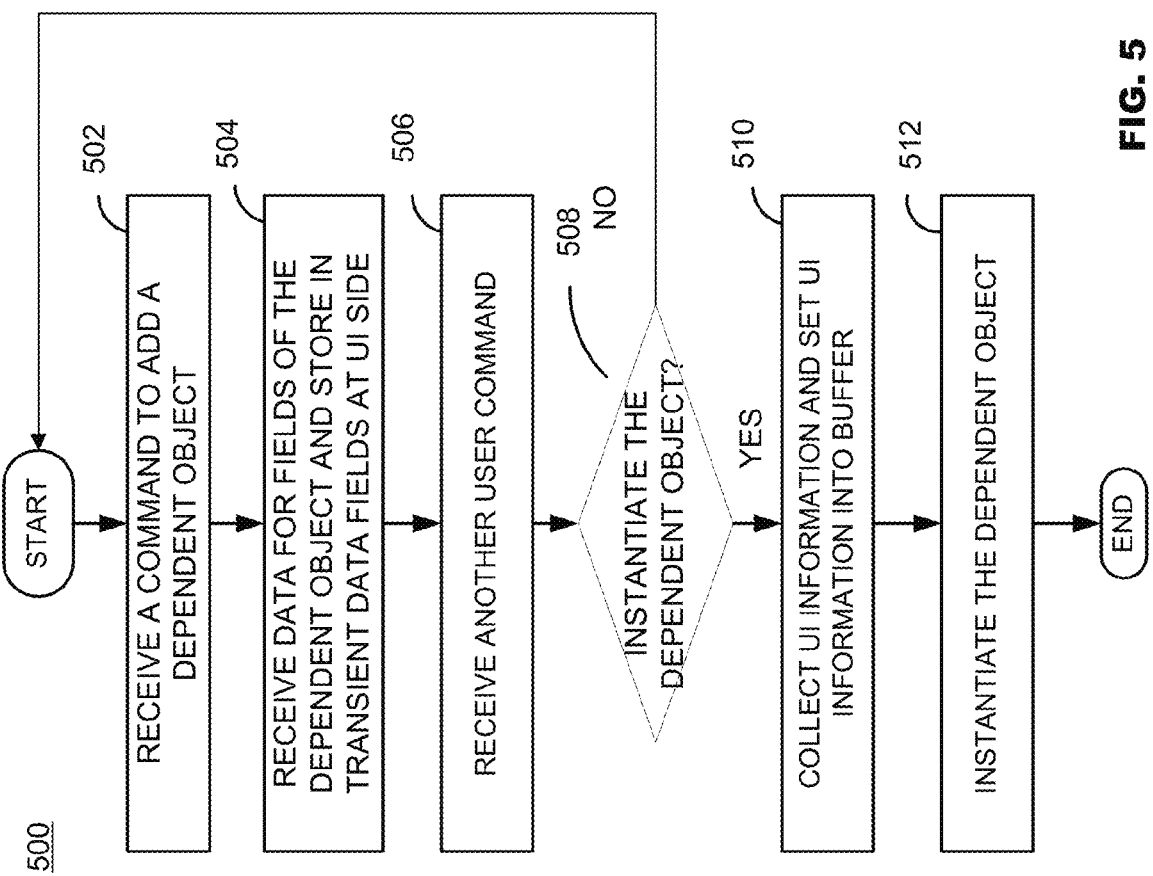
FIG. 5 illustrates a flow diagram of the dependent object user interaction process according to one embodiment of the present invention.

FIG. 5 illustrates a method 500 to provide a late instantiation of a dependent object in an enterprise management system according to an embodiment of the present invention. After start, at block 502, the enterprise management system may receive a command to add dependent object. In one embodiment, for example, a user may click an add button at a UI to add something (e.g., a message, a note) that may be implemented as a dependent object.

At block 504, the enterprise management system may receive data for fields of the dependent object and store in transient data fields at the UI side. As described above, the UI side may include input boxes to accept user input for data fields of the dependent object. The input made by the user, however, may be bound to respective transient field(s) and stored at the UI side. At this stage, the data entered by the user may be handled only at the UI side and no function calls to a backend may be necessary. At block 506, the enterprise management system may receive another user command. At block 508, the enterprise management system may receive may determine whether the dependent object need to be instantiated. If the other user command is to cancel the addition of the dependent object, the data entered by the user may be discarded and no dependent object need to be instantiated. If the other user command is to post the data entered by the user, than the dependent object needs to be instantiated. Therefore, if the determination result at the block 508 is no, the method 500 may return to the start. Responsive to the determination at the block 508 being yes, the method 500 may continue to block 510. At block 510, the enterprise management system may collect UI information and set UI information into a buffer. As described above, the data entered by the user may then being transferred and mapped to dependent object data fields at a controller. Then at block 512, the enterprise management system may instantiate the dependent object.

In one embodiment, instantiation of the dependent object may include physically instantiating the dependent object and perform post algorithms. The post algorithm may include checking to see if the transient data field may be empty and if it is empty, raise an error message. If the user input is not empty, the post algorithm may continue by establishing backend connection, retrieving a root node (main object), retrieving by association from the root node to see if an instance of the dependent object already exists. If no instance of the dependent object exists, the post algorithm may instantiate the dependent object (e.g., one or more layers of dependent objects) and put data values from the transient data field to the newly created dependent object.

Figure 6:
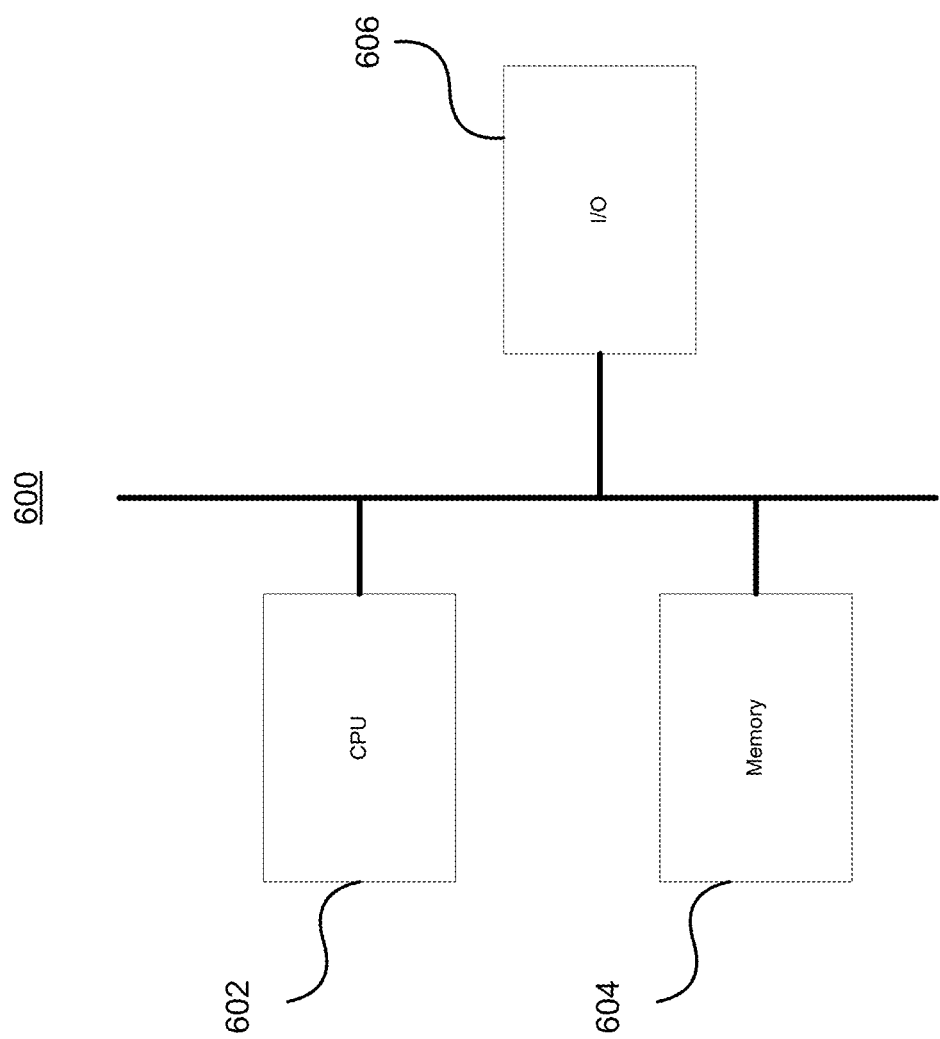
FIG. 6 illustrates a computer system according to an embodiment of the present invention.

FIG. 6 illustrates a computer system 600 according to an embodiment of the present invention. The computer system 600 may represent a computing device that implements an embodiment of the enterprise computer system according to one embodiment. The computer system 600 includes a processor 602, memory 604, and an I/O device(s) 606. The processor 602 is connected to the memory 604 and I/O device (s) 606. These connections are direct or via other internal electronic circuitry or components.

The processor 602 is a programmable processor that executes instructions residing in the memory 604 to receive and send data via the I/O device(s) 606. The instructions may perform the operations of a message handling system according to an exemplary embodiment. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention processor 602 is an Intel® microprocessor.

Memory 604 is a machine-readable medium that stores data that is processed by processor 602. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, hard drives, RAID storage device, flash memory or any combination of these devices). This may include external machine-readable mediums that are connected to processor 602 via one or more I/O device(s) 606.

The I/O device(s) 606 may be one or more input/output interfaces that receive and/or send digital data to and from an external device. Interfaces as used herein are any point of access to an external device where digital data is received or sent, including ports, buffers, queues, subsets thereof, or any other interface to an external device.

Figure 7:
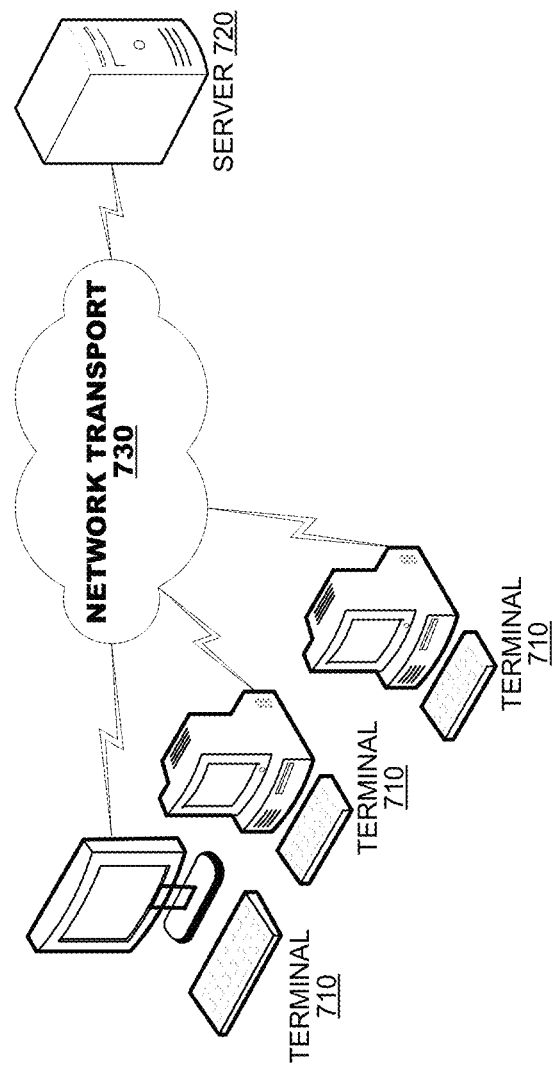
FIG. 7 is a simplified block diagram of a computer network suitable for use with the present invention.

FIG. 7 is a simplified block diagram of a computer system 700 suitable for use with the present invention. The system 700 may include a number of terminals 710 connected to one or more servers 720 via a network 730. The terminals 710, and servers 720 collectively execute a number of applications, which include executable code and various data sets. For example, the server 720 may store data to be provided to various applications running at the server 720, the terminals 710. Various users also may view and operate on common, shared data during execution of various applications but this functionality is not shown in FIG. 7. In one or more embodiments, the enterprise software system that implement business scenario based configuration may be hosted on the server 720 with user interfaces presented on the terminals 710. As noted, FIG. 7 is a simplified block diagram of a computer system 700. Unless noted otherwise, the topology and architecture of the system 700 is immaterial to the present discussion unless otherwise noted.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on a machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method of managing creation of dependent objects in a software application, comprising:
    providing a plurality of independent objects, each of the independent objects executing one or more business processes;
    receiving a first command from a user, the command intending to create a dependent object, the dependent object executing a sub-process of one of the plurality of independent objects;
    enabling a user interface (UI) component at a UI to accept user input at a frontend of the software application, content of the user input being data value targeted for use by dependent object;
    creating a transient data field at the frontend to store the content of the user input;
    receiving a second command from the user; and upon determining that the second command is to post data to a backend, collecting data stored in the transient data field and instantiating the dependent object at the backend and assigning the content of the user input to a data field of the dependent object,
    wherein the dependent object is a child dependent object of a root dependent object, the dependent object is instantiated after the root dependent object is instantiated and the root dependent object is instantiated responsive to receiving the post data command.

2. The method of claim 1, further comprising:
    upon determining that the second command is to cancel creation of the dependent object, disabling the UI component and discarding the transient data field.

3. The method of claim 1, wherein the UI component is a text box and the dependent object is a message or a note.

4. The method of claim 1, wherein the frontend comprises a controller that maintains mapping information to map the transient data field to the data field of the dependent object and implements a method to instantiate the dependent object.

5. The method of claim 1, wherein the UI corresponds to a main UI object at the backend, and the dependent object is a dependent object of the main UI object and does not exist by itself.

6. A computing device, comprising:
    storage for computer program instructions,
    a display device, and
    a computer processor configured to execute the computer instructions to:
        provide a plurality of independent objects, each of the independent objects to execute one or more business processes;
        receive a first command from a user, the command intending to create a dependent object, the dependent object to execute a sub-process of one of the plurality of independent objects;
        enable a user interface (UI) component at a UI to accept user input at a frontend of the software application, content of the user input being data value targeted for use by dependent object;
        create a transient data field at the frontend to store the content of the user input;
        receive a second command from the user; and upon determining that the second command is to post data to a backend, collect data stored in the transient data field and instantiate the dependent object at the backend and assign the content of the user input to a data field of the dependent object, wherein the dependent object is a child dependent object of a root dependent object, the dependent object is instantiated after the root dependent object is instantiated and the root dependent object is instantiated responsive to receiving the post data command.

7. The computing device of claim 6, wherein the computer processor is further configured to execute the computer instructions to:

upon determining that the second command is to cancel creation of the dependent object, disable the UI component and discard the transient data field.

8. The computing device of claim 6, wherein the UI component is a text box and the dependent object is a message or a note.

9. The computing device of claim 6, wherein the frontend comprises a controller that maintains mapping information to map the transient data field to the data field of the dependent object and implements a method to instantiate the dependent object.

10. The computing device of claim 6, wherein the UI corresponds to a main UI object at the backend and the dependent object is a dependent object of the main UI object and does not exist by itself.

11. A non-transitory computer readable storage medium having stored thereon computer instructions that, when executed by a computing device, cause the computing device to:

provide a plurality of independent objects, each of the independent objects to execute one or more business processes;

receive a first command from a user, the command intending to create a dependent object, the dependent object to execute a sub-process of one of the plurality of independent objects;

enable a user interface (UI) component at a UI to accept user input at a frontend of the software application, content of the user input being data value targeted for use by dependent object;

create a transient data field at the frontend to store the content of the user input;

receive a second command from the user; and upon determining that the second command is to post data to a backend, collect data stored in the transient data field and instantiate the dependent object at the backend and assign the content of the user input to a data field of the dependent object, wherein the dependent object is a child dependent object of a root dependent object, the dependent object is instantiated after the root dependent object is instantiated and the root dependent object is instantiated responsive to receiving the post data command.

12. The non-transitory computer readable storage medium of claim 11, further comprising:

upon determining that the second command is to cancel creation of the dependent object, disabling the UI component and discarding the transient data field.

13. The non-transitory computer readable storage medium of claim 11, wherein the UI component is a text box and the dependent object is a message or a note.

14. The non-transitory computer readable storage medium of claim 11, wherein the frontend comprises a controller that maintains mapping information to map the transient data field to the data field of the dependent object and implements a method to instantiate the dependent object.

15. The non-transitory computer readable storage medium of claim 11, wherein the UI corresponds to a main UI object at the backend, and the dependent object is a dependent object of the main UI object and does not exist by itself.

16. A method of managing creation of dependent objects in a software application, comprising:

providing a plurality of independent objects, each of the independent objects executing one or more business processes;

receiving a first command from a user, the command intending to create a dependent object, the dependent object executing a sub-process of one of the plurality of independent objects;

enabling a user interface (UI) component at a UI to accept user input at a frontend of the software application, content of the user input being data value targeted for use by dependent object, wherein the UI component is a text box and the dependent object is a message or a note;

creating a transient data field at the frontend to store the content of the user input;

receiving a second command from the user; and upon determining that the second command is to post data to a backend, collecting data stored in the transient data field and instantiating the dependent object at the backend and assigning the content of the user input to a data field of the dependent object, wherein the backend comprises a controller that maps the transient data field to the data field of the dependent object and implements a method to instantiate the dependent object;

wherein the UI corresponds to a main UI object at the backend, and the dependent object is a dependent object of the main UI object and does not exist by itself, and wherein the dependent object is a child dependent object of a root dependent object, the dependent object is instantiated after the root dependent object is instantiated and the root dependent object is instantiated responsive to receiving the post data command.

17. The method of claim 1, wherein the command intending to create the dependent object does not create the dependent object until the second command to post data to the backend is received.

* * * * *